(12) United States Patent
Vrenjak et al.

(10) Patent No.: US 6,718,032 B1
(45) Date of Patent: Apr. 6, 2004

(54) READ-ONLY IN-MEMORY TABLES FOR INTELLIGENT CALL PROCESSING SYSTEM

(75) Inventors: Milan Vrenjak, Coral Springs, FL (US); Jeff Swartz, Coral Springs, FL (US); Jeff Gerardot, Cicero, IN (US)

(73) Assignee: Interactive Intelligence, Indianapolis, IN (US)

( * ) Notice: Subject to any disclaimer, the term of this patent is extended or adjusted under 35 U.S.C. 154(b) by 637 days.

(21) Appl. No.: 09/615,495

(22) Filed: Jul. 13, 2000

Related U.S. Application Data

(60) Provisional application No. 60/143,459, filed on Jul. 13, 1999, and provisional application No. 60/186,189, filed on Mar. 1, 2000.

(51) Int. Cl.⁷ .......................... H04M 3/00; H04M 3/42; H04M 3/523; G06F 17/30
(52) U.S. Cl. ................. 379/268; 707/1; 707/8; 379/201.02; 379/265.01
(58) Field of Search ...................... 379/9, 9.06, 201.01, 379/201.02, 201.05, 201.12, 207.02, 265.01, 265.02, 268, 269, 279; 707/1, 8, 10, 200, 201, 202, 203, 204

(56) References Cited

U.S. PATENT DOCUMENTS

| | | | |
|---|---|---|---|
| 5,255,305 A | 10/1993 | Sattar | 379/34 |
| 5,390,335 A | 2/1995 | Stephan et al. | 395/800 |
| 5,448,632 A | 9/1995 | Iyob et al. | 379/201 |
| 5,452,341 A | 9/1995 | Sattar | 379/88 |
| 5,546,455 A | 8/1996 | Joyce et al. | 379/265 |
| 5,590,181 A | 12/1996 | Hogan et al. | 379/114 |
| 5,754,636 A | 5/1998 | Bayless et al. | 379/142 |
| 5,875,242 A | 2/1999 | Glaser et al. | 379/207 |
| 5,923,745 A | 7/1999 | Hurd | 379/220 |
| 5,933,828 A | 8/1999 | Eitel et al. | 707/10 |
| 5,940,487 A | 8/1999 | Bunch et al. | 379/201 |
| 5,974,114 A * | 10/1999 | Blum et al. | 379/9 |
| 6,457,021 B1 * | 9/2002 | Berkowitz et al. | 707/201 |

* cited by examiner

Primary Examiner—Harry S. Hong
(74) Attorney, Agent, or Firm—Woodard, Emhardt, Moriarty, McNett & Henry LLP

(57) ABSTRACT

A novel communication handling system 25 is disclosed. In one embodiment, communication handler process 120 accesses read-only, in-memory copies 130 of data tables from read-write table storage 140. In this embodiment, handler process 120 provides control information to hardware 101 so that hardware 101 performs selected actions, such as playing a recorded message, recording a message from the caller, transferring the call to a particular extension, etc. In other embodiments, communication handler process 120 directs voice, data, or video chat requests delivered via an external network 55. In still other embodiments, the in-memory copies 130 are updated manually and/or automatically. In further embodiments, handler process 120 may perform operations on sets of records from in-memory copies 130.

16 Claims, 2 Drawing Sheets

READ-ONLY IN-MEMORY TABLES FOR INTELLIGENT CALL PROCESSING SYSTEM

REFERENCE TO RELATED APPLICATIONS

Benefit is claimed under 35 U.S.C. §119(e) based on U.S. Provisional Patent Application No. 60/143,459, filed Jul. 13, 1999, and U.S. Provisional Patent Application No. 60/186,189, filed Mar. 1, 2000, which are incorporated by reference in their entireties.

BACKGROUND OF THE INVENTION

The present invention relates to a system for handling communications. More specifically, it relates to a system using computers to handle telephone calls and other communications for a call center.

Many different systems exist for handling communications in an organization. For example, incoming calls can be handled by a voice messaging (VM) system, interactive voice response (IVR) unit, automatic call distributor (ACD), and fax server. These devices may be purchased separately from different manufacturers and integrated into a single system. Unfortunately, such integration is often difficult.

Some attempts to overcome the difficulty of integration have relied on control data to allow some customization of the communication switching and relaying processes, but there still exists a need for more efficient and flexible system and method for storing and accessing that control data, and for using control data to operate a call center communication distribution server.

SUMMARY OF THE INVENTION

One form of the present invention is a unique telecommunication management system using cached tables to assist in controlling the system. Further forms include systems and methods for controlling a communication distributor using cached control database tables. Other embodiments, forms, variations, objects, features, and applications may appear to those skilled in the art from the drawings and description contained herein.

DESCRIPTION OF THE PREFERRED EMBODIMENTS

One or more examples of systems implementing the present invention will now be discussed in relation to specific drawings, components, and relationships. It should be understood, however, that the disclosure herein is merely illustrative and does not limit the intended scope of the present invention. Furthermore, each documents to which this disclosure refers is hereby incorporated by reference in its entirety, as if fully set forth herein.

Figure 1:
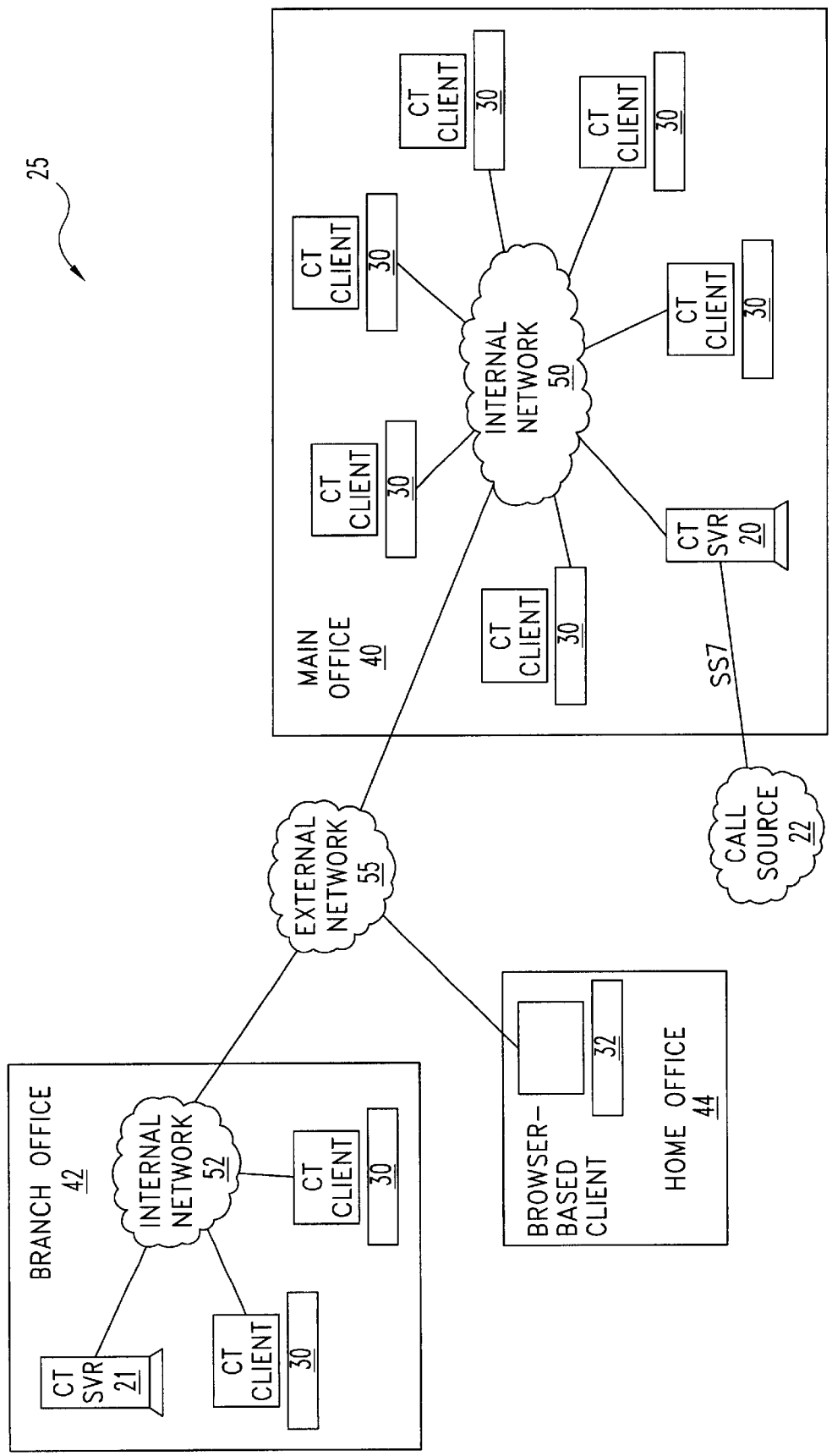
FIG. 1 is a block diagram of selected components of a computer network.

FIG. 1 is a diagram of system 25 of one exemplary embodiment of the present invention. As illustrated, system 25 serves a multi-site call center, and includes main office 40 coupled to branch office 42 and home office 44 by external network 55. At each office 40, 42, and 44, one or more call center agents receive communications, for example, technical support telephone calls from consumers. Network 55 can be one or more types of suitable communication links, such as the Internet, a virtual private network (VPN), and/or dedicated line to name just a few. In other embodiments, more or fewer branch offices 42 or home offices 44 may be present. Main office 40 includes computer telephony (CT) server 20. In the exemplary embodiment shown in FIG. 1, incoming calls to the multi-site call center are presented to the company's system 25 at server 20 by call source 22. Call source 22 may be a local exchange carrier (LEC), interexchange carrier (IEC), Internet access provider (IAP), or other entry point for telephonic communications. The connection between call source 22 and server 20 may comprise a series of links between various telephony components, the last link preferably operating as a bi-directional link as specified by Signalling System No. 7 ("SS7") of the Consultative Committee on International Telephone and Telegraphy (or "Comite Consultatif Internationale de Telegraphique et Telephonique", or "CCITT," now known as the Telecommunication Standardization Sector of the International Telecommunications Union, or "ITU-TSS," or "ITU-T").

As discussed further below, CT server 20 determines the appropriate handling for the call based on information available to it. In one example, Automatic Number Identification (ANI) data indicates that the call originated with a client of a particular agent, so CT server 20 may forward the call to a queue of calls waiting for that agent's extension. In another example, Dialed Number Identification Service (DNIS) indicates that the caller has dialed a telephone number for the product support line for a particular product, so CT server 20 may forward the call to a queue of calls waiting for agents with expertise or training in supporting that product. In still another example, the time of day and current queue status for a collection of call receiving agents might require a call to be placed on hold, a recorded message to be played, and a notification message to be displayed on one or more displays associated with the agents. In still other embodiments, different call handling techniques can be used common to call center and/or ACD systems.

In the present exemplary embodiment, the agents may each correspond to one of the CT clients 30 of main office 40 or branch office 42. CT server 21, CT clients 30, and internal network 52 at branch office 42 function analogously to CT server 20, CT clients 30, and internal network 50, respectively, at main office 40. Home office 44 includes browser-based client 32 corresponding to a remote, at-home agent. Clients 30 are preferably in the form of computer workstations with standard input equipment such as a keyboard and mouse, and standard output equipment, such as a digital display configured to visually present character and/or graphic information. One or more telephone headsets and/or handsets ("telephones" herein) are also typically associated with each CT client 30. These telephones are operably coupled to CT server 20 by network 50 and 52, for offices 40 and 42, respectively, or a separate network (not shown) such as a PBX system. In one embodiment, a separate analog telephone network is utilized which is coupled to one or more telephone system interface devices installed in CT server 20.

Information related to incoming calls is routed through main office 40 among CT clients 30 via internal network 50 (which may be a LAN or other suitable network). If a call is to be taken by an individual at branch office 42, then the corresponding data is routed from CT server 20 through external network 55 to internal network 52 at branch office 42. For home office 44, an individual receives call data (using browser-based client 32) directly from external network 55 without an intervening internal network 52 or CT server 20.

Users of system 25 may access system information and receive call data using software applications on CT clients 30 or browser-based clients 32. In order to provide broad access and flexibility, client software is preferably implemented in a programming language that can be used with many types of computing hardware and operating systems, such as the JAVA programming language. (JAVA is a trademark or registered trademark of Sun Microsystems, Inc. of Palo Alto, Calif., USA in the United States and other countries.) This software may be executed by any suitable computer hardware, including for example a general-purpose computer, such as a computer using a PENTIUM III processor (manufactured by Intel Corporation of Santa Clara, Calif., USA) and running the WINDOWS NT operating system (published by Microsoft Corporation of Redmond, Wash., USA), a "network computer" including, for example, a CELERON processor (manufactured by Intel) and running the JAVAOS operating system (published by Sun Microsystems), or a POWER MAC (manufactured by Apple Computer of Cupertino, Calif., USA).

It should be understood that additional hardware may be included in the system, including for example firewalls, routers, switches, gateways, and additional audio input and output equipment, as needed or desired in a given user environment. Further, additional connectivity and redundancy may be provided by additional internal network 50, 52, external network 55, and CT servers 20, 21.

In another embodiment, one or more additional call sources 22 provide incoming calls to CT server 21 at branch office 42 for similar processing through the networks discussed herein.

Figure 2:
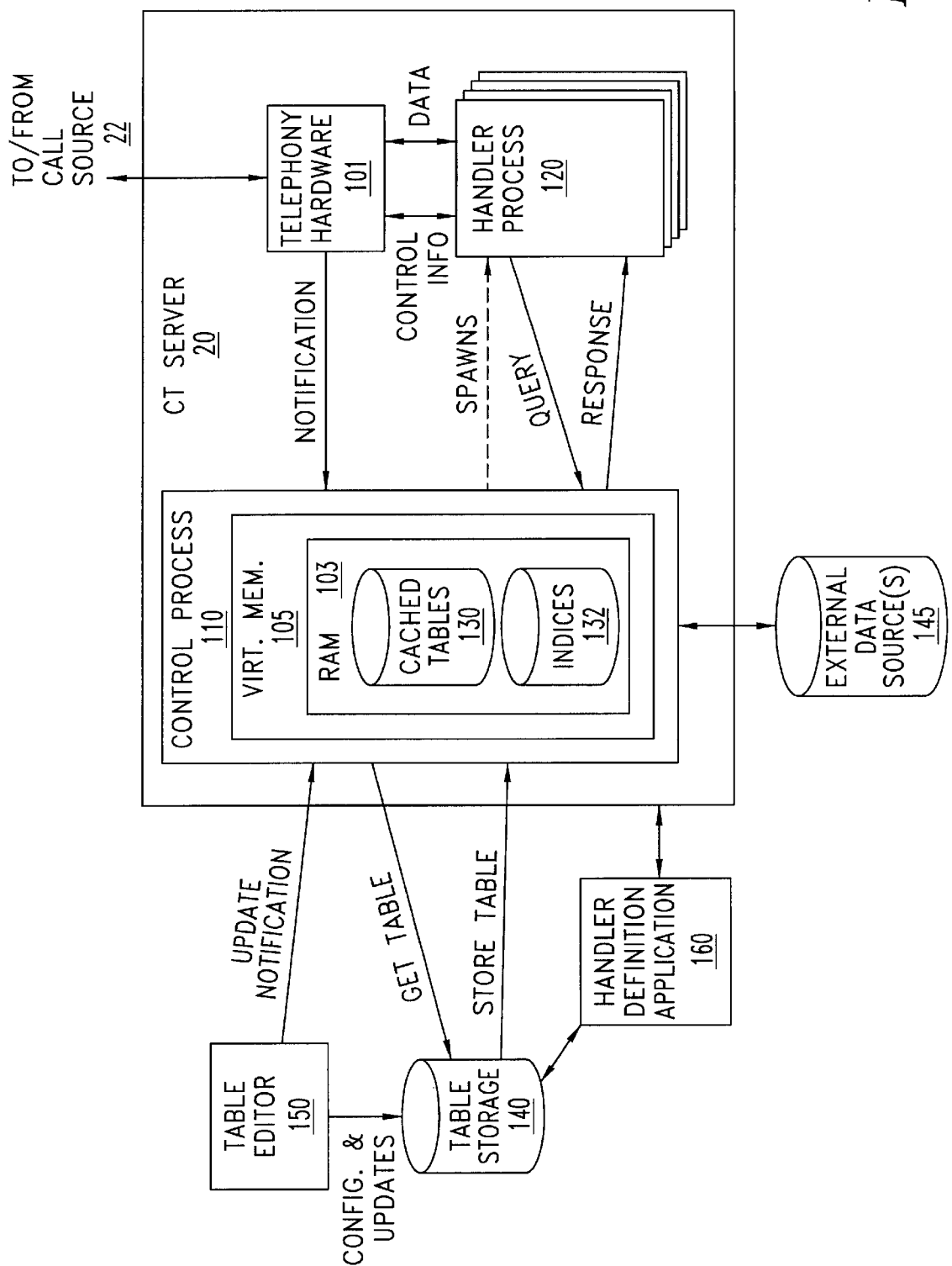
FIG. 2 is a block diagram of a communication server, storage elements, and software showing the flow of certain data.

Turning additionally to FIG. 2, certain components related to CT server 20 (see also FIG. 1) will be described with the understanding that CT server 21 operates analogously. In the illustrated embodiment, CT Server 20 is a hardware- and software-based communications server, including communication hardware 101, random-access memory 103, virtual memory 105, a control process 110, and handler processes 120 with an underlying operating system (not shown). Communication hardware 101 comprises a number of software-controlled switches to route call center communications to CT clients 30 as appropriate. In embodiments that handle voice communications, hardware 101 preferably comprises one or more computer telephony boards manufactured by Dialogic Corporation (of Parsippany, N.J., USA). A microprocessor (not shown) in server 20 executes programming instructions to run control process 110, handler processes 120, and the other components of server 20 according to desired procedures. These programming instructions are stored in a computer-readable medium, such as RAM 103, virtual memory 105, and/or other media not shown (for example, one or more of a hard disk drive, a floppy disk drive, PROM, CD-ROM, or DVD-ROM). The combination of hardware 101 and processes 110 and 120 provides, among other things, the functionality of an automated communication distributor 112. In some other embodiments, an automated call distributor is included as a separate physical device in connection with server 20.

Incoming call center communication data arrives at CT server 20 from call source 22 at communication hardware 101. In normal operation, CT server 20 executes control process 110, which listens for incoming calls. When hardware 101 receives a new call, control process 110 spawns a new handler process 120, also executed by CT server 20, to handle it. The new handler-process 120 communicates with hardware 101 to obtain any available information about the call.

Handler process 120 also queries control process 110 for information from in-memory tables 130 for use in handling the incoming/call. Control process 110 accepts the query and returns responsive data to handler process 120. This data includes, for example, hours of operation, system configuration information, and records matching each agent with his or her telephone extension, computer address, skill levels, experience levels, work periods, and supervisor. Based on the data returned by control process 110, handler process 120 determines the appropriate action(s) to take (including, for example, playing a recorded message, accepting DTMF input, recording a voice mail message, transferring the call to an agent's CT client 30, or controlling hardware 101 to forward the call to a particular internal extension or to a remote, external site) and takes them.

The information in each in-memory table 130 is a read-only copy of all or part of a table in table storage 140, possibly combined with other external data as described below. It has been observed that handler process 120 needs only read-access to in-memory tables 130. The read-only nature of the in-memory tables 130 allows the program routines that access the tables (such as a database management system (DBMS) that is in or controlled by control process 110) to be greatly simplified. In some embodiments, this simplification may provide much shorter response times to queries by handler processes 120. In other embodiments, fewer system resources (for example, memory and CPU cycles) will be used to manage access to the tables than are used by conventional DBMS systems.

To further reduce access latency, control process 110 maintains indices 132 to the in-memory tables 130 using techniques known in the art.

The information in in-memory tables 130, in turn, includes part or all of the information in non-volatile table storage 140. Table storage 140 preferably comprises a conventional database stored on a mass media device, such as a hard disk drive. Managers and/or system administrators may use a table editor application 150 to create, update, modify, or delete tables and table data from table storage 140. When such changes are made, table editor 150 sends an update notification message to control process 110, which reads the updated table from table storage 140 to the in-memory table collection 130 and updates its indices 132 accordingly. In one embodiment, in-memory tables 130 and indices 132 are stored in random-access memory (RAM) 103 associated with CT server 20. In another embodiment, in-memory tables 130 are stored in virtual memory 105 associated with CT server 20, which may at times be swapped out of physical RAM 103 to, for example, a hard disk (not shown). In still other embodiments, in-memory tables 130 and indices 132 are stored in one or more other types of physical and/or logical memory as would occur to those skilled in the art.

In any particular embodiment of this invention, the components shown in FIG. 2 may together provide functionality formerly provided by many separate systems, including the VM, IVR, ACD, and fax server systems discussed above. Additional functionality may be enabled by the flexibility and user-configurable aspects of the present system.

In some embodiments, queries from handler process 120 can filter and/or sort over more than one field of cached tables 130 by accessing multiple indices 132 in a single query using methods known to those skilled in the art.

In other embodiments, each column in each table of table storage 140 (and, therefore, each corresponding column and table in cached tables 130) is associated with a globally unique identifier (GUID) that uniquely identifies that column. In some of these embodiments, the GUID for a particular column is unchanged by database version updates, table exports and imports, collaborative system access, system backups and restores, etc.

In still other embodiments, in-memory tables 130 are linked to or include data from external data source(s) 145 in addition to data from table storage 140. In these embodiments, data from external data source(s) 145 can be combined with data from table storage 140 as in-memory tables 130 are being populated (or repopulated, or otherwise updated), when control process 110 requires the information in order to respond to a query from a handler process 120, when the external data source(s) is (are) updated, or at predetermined intervals.

In further embodiments, in-memory tables 130 are updated manually, automatically, or a combination of both. Automatic updates are triggered by changes to the data in table storage 140, presence or modification of other data files (such as a semaphore or update file, or an external data source 145), passage of a certain amount of time, occurrence of a certain day and/or time, and/or other update triggers that may be known to those skilled in the art.

In the illustrated embodiment, a handler definition application 160 is shown. Application 160 interacts with table storage 140 during a user's creation and/or modification of the routines run by handler processes 120 so that queries discussed above can properly use the data from in-memory tables 130. This application 160 enables users to customize the automatic distribution of communications by server 20.

In some embodiments, the system 25 enables the system managers, in the creation and/or modification of handler routines, to perform or include operations on data in records or sets of records (rowsets) from in-memory tables 130.

In still further embodiments, requests by outside parties (not shown) for text-, voice-, and/or video-chat discussions are presented to the system 25 (for example, via external network 55, the Internet, or Internet2) at communication hardware 101 and are also handled by CT servers 20, 21 in a fashion analogous to telephonic call handling discussed above.

In a still further embodiment, CT servers 20 and 21 are each connected to a PBX or other telephone system for routing of calls either in addition to or in lieu of internal network 50.

In another embodiment, CT servers 20 and 21 additionally or alternatively handle outgoing communications from main office 40 or branch office 42, respectively, based on information in in-memory tables 130. For example, least-cost routing data for facsimile and/or voice calls can be accessible in in-memory tables 130 in such an embodiment.

In yet another embodiment, remote access to and control of control process 110, handler process(es) 120, table editor 150, handler definition application 160, or other functionality of the system 25 is available from one or more other locations via internal networks 50 and/or 52, external network 55, call source 22, or other network (not shown).

Certain embodiments of the present invention include a software-controlled call center communication switch; a readable, writable table of control information; a first read-only copy of the table; and a handler that queries the first copy to obtain a result, and controls the call center communication switch to distribute communications in a call center based on the result. Some of these embodiments also include a database manager for creating a second read-only copy of the table after the table changes, and the handler queries the second copy and controls the call center communication switch to distribute calls based on the result. Alternatively or additionally, the embodiment also includes a PBX system connected to the call center communication switch and a plurality of telephones connected to said PBX system; and the handler also includes a programmable selection means for selecting one or more of the plurality of telephones to which to connect each of the telephone calls.

In other embodiments, a system stores control information in a table, creates a first read-only copy of the table, receives a first communication connection request, queries the first copy in response to the "receiving" step to obtain a first result, and handles the first communication connection request based on the first result. In some of these embodiments, the system also changes the table, then makes a second read-only copy of the table, receives a second telephone call connection request, queries the second copy to obtain a second result, and handles the second telephone call connection request based on the second result.

Still other embodiments include an automatic call center communication switch and a computer readable medium encoded with programming instructions for the switch, the programming instructions being executable to generate a read/write table of control data, a first read-only copy of the table; and a first command signal for the switch, the command signal being based on data in the first copy Modifications of the present disclosure and claims, as would occur to one skilled in the art, may be made within the scope of the present invention.

What is claimed is:

1. An apparatus comprising:
    a software-controlled call center communication switch;
    a readable, writable table of control information;
    a first read-only copy of said table; and
    a handler operative to query said first copy to obtain a result, and operative to control said call center communication switch to distribute communications in a call center based on said result.

2. The apparatus of claim 1, further comprising:
    a database managing means for creating a second read-only copy of said table after said table changes;
    wherein said handler is operative to query said second copy and to control said call center communication switch to distribute calls based on the result.

3. The apparatus of claim 1, wherein said table is stored on a non-volatile medium.

4. The apparatus of claim 3, wherein said non-volatile medium is a hard disk.

5. The apparatus of claim 1, wherein said first copy is stored in RAM.

6. The apparatus of claim 1, wherein said table is stored on a non-volatile medium, and said first copy is stored in RAM.

7. The apparatus of claim 1 further comprising:
    a PBX system operatively connected to said call center communication switch; and
    a plurality of telephones connected to said PBX system; and
    wherein
    wherein said handler further comprises a programmable selection means for selecting one or more of said plurality of telephones to which to connect each of the telephone calls.

8. The apparatus of claim 1, wherein said control information comprises hours of operation of said call center.

9. The apparatus of claim 1, wherein:

said first copy comprises a plurality of records; and said result consists of more than one of said plurality of records.

10. A method, comprising:

storing control information in a table;

creating a first read-only copy of the table;

receiving a first communication connection request;

querying the first copy in response to said receiving to obtain a first result; and handling the first communication connection request based on the first result.

11. The method of claim 10, further comprising:

changing the table;

after said changing, making a second read-only copy of the table;

receiving a second communication connection request;

querying the second copy to obtain a second result; and handling the second telephone call connection request based on the second result.

12. The method of claim 11, wherein said making is manually triggered.

13. The method of claim 11, wherein said making is automatically triggered.

14. The method of claim 11, wherein:

the first copy comprises a plurality of records; and the first result consists of more than one of the plurality of records.

15. An apparatus, comprising:

an automatic call center communication switch; and a computer readable medium encoded with programming instructions for said switch, the programming instructions being executable to generate:

a read/write table of control data;

a first read-only copy of said table; and a first command signal for said switch, said first command signal being based on control data read from said first copy.

16. The apparatus of claim 15, wherein said programming instructions are further executable to generate:

a second read-only copy of said table, which reflects changes in said table; and a second command signal for said switch, said second command signal being based on data read from said second copy.

* * * * *